United States Patent
Richard et al.

(10) Patent No.: US 9,212,770 B2
(45) Date of Patent: Dec. 15, 2015

(54) METHOD AND APPARATUS FOR ATTACHING FLANGE PORTIONS TO DUCTS

(75) Inventors: Alain Denis Richard, North Windham, CT (US); Richard Carl Houle, Jr., Chaplin, CT (US); Michael Paul Houle, Columbia, CT (US)

(73) Assignee: RAM Developing, LLC, North Windham, CT (US)

( * ) Notice: Subject to any disclaimer, the term of this patent is extended or adjusted under 35 U.S.C. 154(b) by 1620 days.

(21) Appl. No.: 11/779,786

(22) Filed: Jul. 18, 2007

(65) Prior Publication Data

US 2009/0022569 A1 Jan. 22, 2009

(51) Int. Cl.
*F16L 23/00* (2006.01)
*F16L 23/14* (2006.01)
*F24F 13/02* (2006.01)
*F16B 25/10* (2006.01)

(52) U.S. Cl.
CPC ............. *F16L 23/14* (2013.01); *F24F 13/0209* (2013.01); *F16B 25/10* (2013.01)

(58) Field of Classification Search
USPC .......................... 285/424, 405, 414, 368, 412; 403/408.1; 248/316.7, 74.2
See application file for complete search history.

(56) References Cited

U.S. PATENT DOCUMENTS

| | | | |
|---|---|---|---|
| 641,580 A | | 1/1900 | Cummins |
| 1,450,826 A | * | 4/1923 | Walten ........................... 138/159 |
| 2,369,697 A | * | 2/1945 | Werkenthin et al. .......... 285/242 |
| 3,010,353 A | * | 11/1961 | Psaros ........................... 411/456 |
| 3,018,120 A | * | 1/1962 | Vann ................................ 285/55 |
| 3,712,650 A | * | 1/1973 | Mez ............................... 285/405 |
| 3,923,326 A | * | 12/1975 | Mez ............................... 285/363 |
| 4,252,350 A | * | 2/1981 | Smitka .......................... 285/363 |
| 4,283,080 A | * | 8/1981 | Nakajima ...................... 285/405 |
| 4,288,115 A | * | 9/1981 | Sullivan ........................ 285/363 |
| 4,410,206 A | * | 10/1983 | Mez ............................... 285/405 |
| 4,447,079 A | * | 5/1984 | Sullivan ........................ 285/363 |
| 4,537,430 A | * | 8/1985 | Sullivan ........................ 285/364 |
| 4,542,923 A | * | 9/1985 | La Crosse et al. ............ 285/424 |
| 4,552,388 A | * | 11/1985 | Meinig .......................... 285/363 |
| 4,558,892 A | * | 12/1985 | Daw et al. ..................... 285/331 |
| 4,564,227 A | | 1/1986 | Murck |
| 4,725,083 A | | 2/1988 | Schauer |
| 4,861,631 A | * | 8/1989 | Hinden et al. ............... 428/34.5 |

(Continued)

FOREIGN PATENT DOCUMENTS

CA 2122847 11/1995
EP 47467 A1 * 3/1982 .............. F16L 23/00

(Continued)

OTHER PUBLICATIONS

"Sleeves for Fire Dampers—Sleeve Installation Instructions," Hart & Cooley, Inc., 2003.

(Continued)

*Primary Examiner* — Aaron Dunwoody
(74) *Attorney, Agent, or Firm* — O'Shea Getz P.C.

(57) ABSTRACT

A flange to be assembled to a duct member includes a plurality of pre-fabricated apertures or areas of weakened wall strength for receiving fasteners to assemble the flange to the end of a duct member. The apertures may be spaced apart such that the fasteners can be inserted at regular intervals along the length of the flange and the length of the end of the duct member.

14 Claims, 7 Drawing Sheets

(56) References Cited

U.S. PATENT DOCUMENTS

| | | | | |
|---|---|---|---|---|
| 4,940,264 | A * | 7/1990 | Mez | 285/405 |
| 5,015,018 | A * | 5/1991 | Arnoldt | 285/367 |
| 5,054,823 | A * | 10/1991 | Arnoldt | 285/363 |
| 5,103,872 | A | 4/1992 | Jyh-Long | |
| 5,129,690 | A * | 7/1992 | Meinig et al. | 285/363 |
| 5,133,580 | A * | 7/1992 | Meinig | 285/363 |
| 5,135,270 | A * | 8/1992 | Arnoldt et al. | 285/363 |
| 5,165,736 | A * | 11/1992 | De Waal | 285/424 |
| 5,352,000 | A * | 10/1994 | Issagholian-Havai et al. | 285/405 |
| 5,429,116 | A * | 7/1995 | Brown | 126/299 D |
| 5,448,815 | A * | 9/1995 | Kolesar | 29/243.5 |
| 5,494,244 | A | 2/1996 | Walton | |
| 5,621,956 | A * | 4/1997 | Kolesar | 29/243.5 |
| 5,687,514 | A | 11/1997 | Gillispie | |
| 5,703,892 | A | 12/1997 | Claisse et al. | |
| 5,983,496 | A * | 11/1999 | Hermanson | 29/890.15 |
| 6,301,781 | B1 * | 10/2001 | Hermanson | 29/890.15 |
| 6,561,553 | B1 * | 5/2003 | Issagholian-Havai | 285/405 |
| 7,029,037 | B2 * | 4/2006 | Poole | 285/368 |
| 7,195,290 | B2 * | 3/2007 | Duffy | 285/424 |
| 7,216,898 | B1 * | 5/2007 | Hermanson | 285/405 |
| 7,429,020 | B2 * | 9/2008 | Huebner et al. | 248/74.2 |
| 2002/0067950 | A1 * | 6/2002 | Price et al. | 403/338 |
| 2002/0094233 | A1 * | 7/2002 | Price et al. | 403/338 |
| 2004/0033105 | A1 * | 2/2004 | North | 403/408.1 |
| 2005/0116470 | A1 * | 6/2005 | Duffy | 285/424 |
| 2007/0204549 | A1 | 9/2007 | Gerome | |

FOREIGN PATENT DOCUMENTS

| | | | | |
|---|---|---|---|---|
| EP | 354627 | A1 * | 2/1990 | F16L 23/14 |
| EP | 441570 | A1 * | 8/1991 | F16L 23/14 |

OTHER PUBLICATIONS

"Ward Installation—Sleeve Installation Instruction for use with all series fire dampers," Ward Industries, p. 590.4, Jul. 22, 2004, www.wardind.com.

"Ward Component—Solid, Slotted and Punched Angle," Ward Industries, p. 551, Nov. 9, 2004, www.wardind.com.

"Ruskin—FAST and PFMA," Ruskin, 2002.

"Prefco—Supplemental Installation Instructions for EZ Mount Retaining Angles for use on 5000, 5500, & 5600F Series Dampers," Perfect Air Control, Inc., Jun. 2004, www.prefco-hvac.com.

"Model FRA Framed Retaining Angles for U.L. Fire Damper Installations," NCA Manufacturing, Inc., 1999.

"'Quick-Set' Retaining Angles for all Sleeved Fire and Combination Fire/Smoke Dampers, Models QS1 and QS2," Nailor Industries, Inc., Jun. 5, 2003.

"Cost Saving Model WAA—Wrap Around Angles," Leader Industries, Inc., Jun. 1997, www.leaderindustries.com.

"Ward Connector—J Flange and H Flange SMACNA Rated "J" and "H" Transverse Joint Duct Connectors," Ward Industries, p. 530, Oct. 26, 2004, www.wardind.com.

"Punched Angle—Fire Damper Mounting Angle," C.L. Ward & Family Inc., 2003, www.cl.ward.cin.

"A Critical Project", Snips Magazine, vol. 9, No. 1, Jan. 2010.

"Ward Connector—Quick J Flange and Quick J Flange", Ward Industries, Jul. 9, 2009, www.wardind.com.

"Repeater Pro", Ductmate Industries, Inc., www.ductmate.com, Feb. 2011.

* cited by examiner

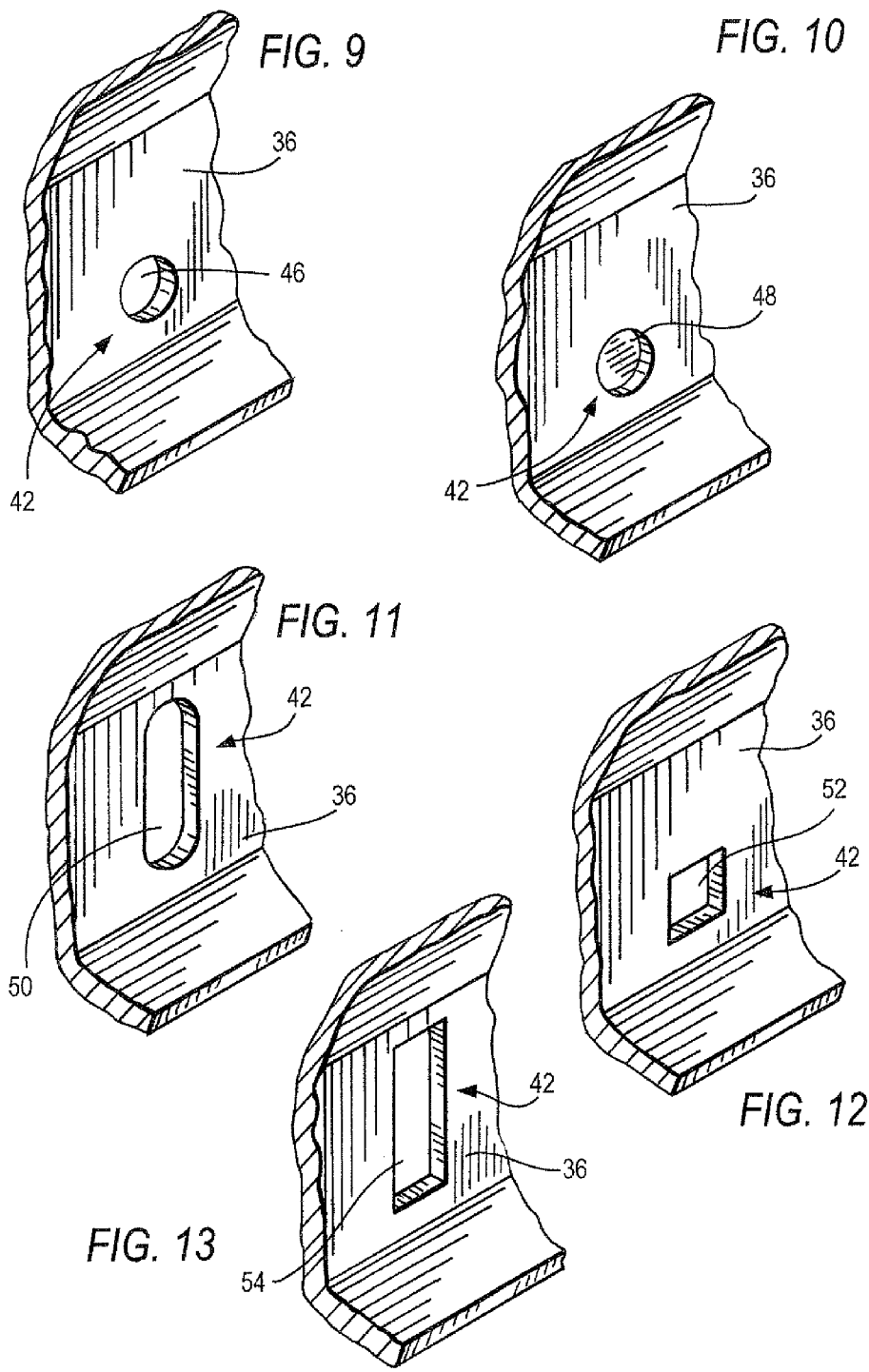

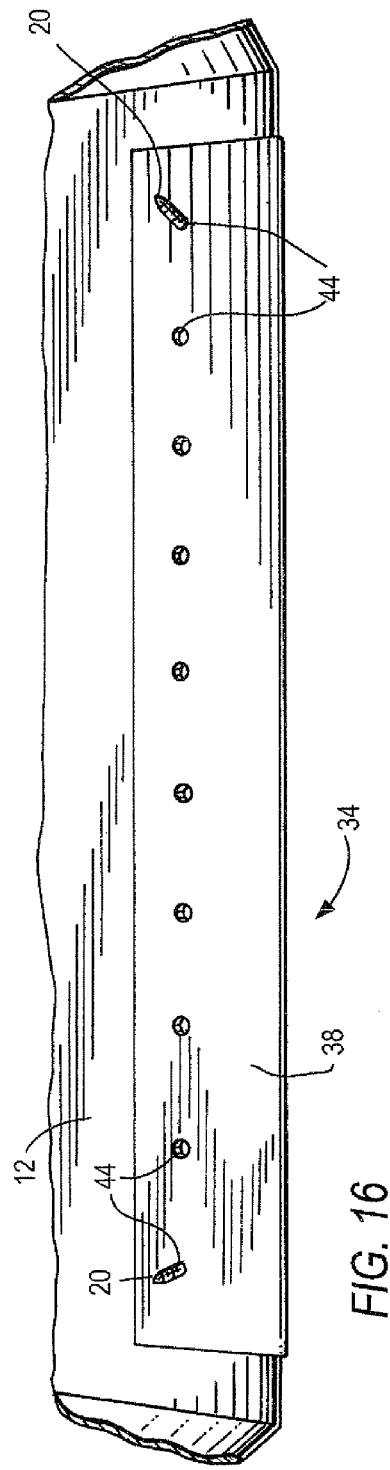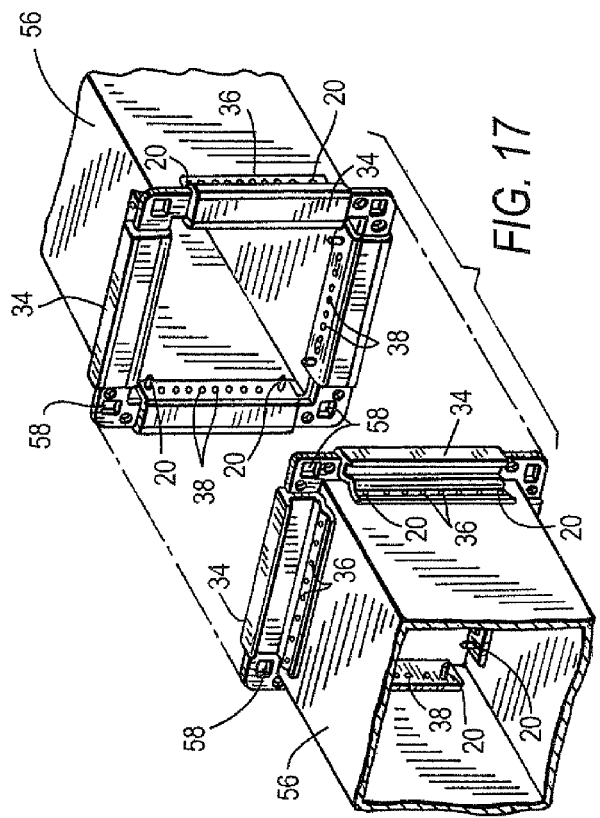

METHOD AND APPARATUS FOR ATTACHING FLANGE PORTIONS TO DUCTS

BACKGROUND OF THE INVENTION

1. Field of the Invention

This invention relates to ducts, and in particular to attaching flange portions to duct members for interconnecting duct members.

2. Description of the Related Art

Ducts and duct work are formed by securely interconnecting duct members and other components such as flanges using fasteners. Various arrangements have been suggested to facilitate the joining. Example devices and methods for such interconnections are shown in U.S. Pat. Nos. 4,288,115; 4,564,227; 4,725,083; 5,103,872; and 5,621,956. In general, they do not most advantageously address issues inherent with material handling, part manipulation, and the ease of assembly, particularly given the often difficult orientation of assembler to workpiece encountered in the installation of a ductwork system. The present invention overcomes these deficiencies by the use of a pre-selected array of depressions or openings in the flanges which permit ready joining.

U.S. Pat. No. 4,288,115 to Sullivan describes a duct jointing system with hollow flange members on the ends of ducts, and having a snap-on cleat for fastening abutting flange members together. A corner portion is shown to have holes in legs, but such holes do not receiving fasteners.

U.S. Pat. No. 4,564,227 to Murck provides a flanged duct joint with snap-in corner pieces having legs which fit into two abutting flanges to assemble the flanges in a joined configuration.

U.S. Pat. No. 4,725,083 to Schauer discloses a flanged joint having walls on flanges shaped for receiving corner pieces. The abutting flanges are joined together by bolting complementary bores in the corner pieces. Depressions in the flange walls are oriented to receive complementary projections from the corner pieces in a friction fit, but the depressions are not and cannot be used to fasten complementary flanges together, since walls of the flanges are interposed between the depressions of the abutting flange walls.

U.S. Pat. No. 5,103,872 to Jyh-Long discloses a flanged joint with abutting flanges retained together by flange clamps and by bolts fastening corner pieces together. The flange strip elements have projections for engaging raised projections on the end portions of the ducts, but not the abutting flange.

U.S. Pat. No. 5,621,956 to Kolesar has flange members with screws inserted for attaching the flange members to the ends of ducts. Bolts pass through bolt holes in the corner pieces attached to the flanges for fastening abutting corner pieces, and thus assembling the flanges and duct sections.

As noted, these prior art teachings present complicated arrangements for securing flanges to the ends of ducts and/or for interconnecting duct members, and such arrangements typically require additional components which make the interconnections more expensive to implement.

Another prior art method for interconnecting duct members, which is being commercially practiced, is shown in FIGS. 1-6, in which multiple layers of sheet metal are placed in juxtaposition, and apertures are created through which joining members are secured. As illustrated, a flange 10 is placed adjacent to an end portion 12 of a duct member. The flange 10 includes at least one wall member 14. The flange 10 includes a pair of wall members 14, 16 joined by an intermediate member 18, with the wall members 14, 16 placed on the duct member such that each wall member 14, 16 is adjacent to opposite sides of the end portion 12.

To secure the flange 10 to the duct member, a fastener 20 is placed adjacent to one of the wall members 14, 16, preferably the wall member adjacent to the exterior surface of the duct member, such as the wall member 14 shown in FIG. 2. A tool 22, such as a drill, or alternatively a repeater tool or gun, is used to provide pressure and optionally a drilling force to the fastener 20 in the direction of the arrow shown in FIG. 2, in order to create apertures 24 in both the flange 10 and the end portion 12 of the duct member, as shown in FIG. 3. In one embodiment, the fastener 20 may be a screw for serving both as a tool workpiece to create the apertures 24 and to function as the inserted fastener 20 after insertion by the tool 22.

In the fastened configuration of FIGS. 3-4, the fastener 20 passes through the apertures 24 to secure the flange to the duct member in the assembled configuration, allowing the flange 10 to join other flanges or components, such that the duct member connected to the flange 10 is positioned and assembled to other duct members, as required.

Although extensively used, this prior art insertion method has numerous disadvantages. For example, by requiring the fastener 20 to pass through multiple solid layers of material; that is, the wall members 14, 16 as well as the end portion 12, each formed of sheet metal, the assembler using the tool 22 must apply significant pressure to the fastener 20 to pierce three layers of metallic material. In addition, if the tool 22 is a drill or other device for applying a rotational force as well as a longitudinal insertion force in the direction of the arrow in FIG. 4, the assembler will experience significantly higher counter-torque as the fastener 20 passes through multiple layers 12-16 of material. These higher pressures and torques reduce the efficiency of insertion of the fastener 20 to join the flange 10 to the duct member, and may also cause injury to the assembler.

Furthermore, as the fastener 20 passes through the flange 10 and the end portion 12, debris at the insertion point from the formed apertures will be positioned between the flange 10 and the end portion 12. Thus, the assembled flange 10 and the end portion 12 often does not have a very tight fit in the final assembly.

Moreover, it is not uncommon that the insertion pressure applied to the fastener 20 typically causes one wall member of the flange and/or the portion of the duct member to bend away from the direction of insertion, and so causing push-out of the components from their original shape, as shown in FIGS. 5-6. The improperly pushed-out, or alternatively pushed-in, and bent flange 26 has an outer wall member 28 and a push-out wall member 30 joined at a bend 32, with the distorted shape of the flange 26 caused by the force of the fastener 20 conveying the insertion pressure from the tool 22, in the direction of the arrow as shown in FIG. 2, to the wall member 30.

Once such push-out or bending occurs and forms the bent flange 26 shown in FIGS. 5-6, the fastener 20 must be removed for re-insertion into the flange 26, and the bent wall members 28, 30 of the flange 26 must be restored to their original shape as shown in FIGS. 1-2, or otherwise wastefully discarded and replaced with a new flange 10 and/or a new fastener 20, in order to provide a properly assembled and secure connection as shown in FIGS. 3-4. Otherwise, the joined flange and duct end assembly shown in FIGS. 5-6 will not be sufficiently secured, and may even be unsecured and thus useless for properly interconnecting ducts ends and components.

Remedying such bending, or in anticipation of bending, pre-clamping the assembly, increases the time to properly assemble the flanges to the duct members, and delays completion of the work. In addition, the inaccuracy and uncertainty of properly inserting the fastener 20 into the flange 26 and end portion 12 increases the chances for injuries due to the need for the duct assembler to manually stabilize both sides of the flange with one's hand near to the insertion point of the fastener 20, while the tool 20 applies the insertion pressure to the fastener 20.

There therefore exists a need exists for a simple and efficient method for securely mounting flanges to duct ends.

BRIEF SUMMARY OF THE INVENTION

A flange to be assembled to a duct member includes a plurality of pre-fabricated apertures or areas of weakened wall strength for receiving fasteners to assemble the flange to the end of a duct member. The apertures may be spaced apart such that the fasteners can be inserted at regular intervals along the length of the flange and the length of the end of the duct member.

BRIEF DESCRIPTION OF THE SEVERAL VIEWS OF THE DRAWINGS

Preferred embodiments of the invention are disclosed hereinbelow with reference to the drawings.

FIGS. 9-13 are top front left side views of enlarged section of the flange of FIGS. 7-8 illustrating alternative embodiments of an aperture of the present invention.

FIG. 16 is top rear elevational view of the assembled flange and end portion of FIG. 12.

FIG. 17 is a top front perspective view of a pair of ducts having flange of the present invention mounted thereon for joining the ducts.

DETAILED DESCRIPTION OF THE INVENTION

The prior art of FIGS. 1-6, having been previously generally described, FIGS. 7-17 describe a flange 34 and portions thereof according to the present invention provided to be assembled to an end portion 12 of a duct member.

Figure 7:
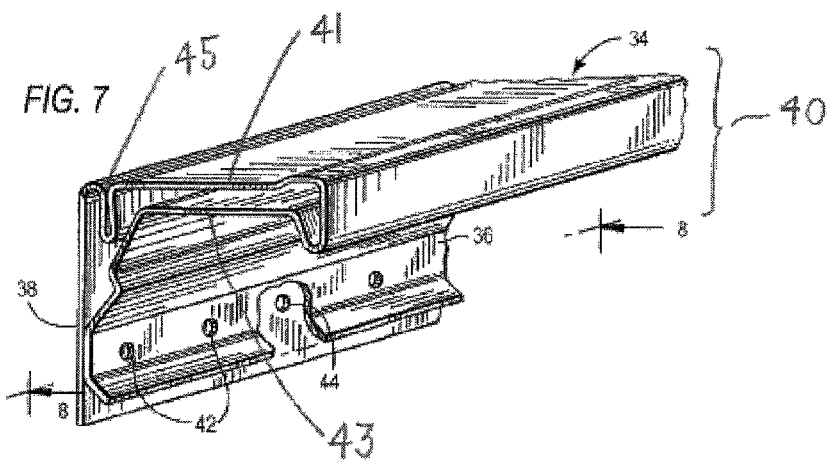
FIG. 7 is a top rear left side perspective view of a flange according to the present invention.

As shown in FIG. 7, an example embodiment of the present invention illustrates a flange 34 including at least a front wall member 36 (also referred to herein as an outer wall member 36) configured in a manner known in the art for joining adjacent flanges 34 together. For example, lateral ends of the front wall member 36 of the flange 34 may include corner sections and/or apertures known in the art, such as shown in FIG. 17 and described in greater detail in U.S. Pat. Nos. 4,288,115; 4,564,227; 4,725,083; 5,103,872; and 5,621,956, which are incorporated herein by reference. Such corner sections and/or apertures permit the flanges 34 secured to duct members to be assembled to join such duct members together in a manner known in the art. It is to be understood that the flange 34 may be of any size, shape, or configuration, such as flanges known in the art.

Figure 14:
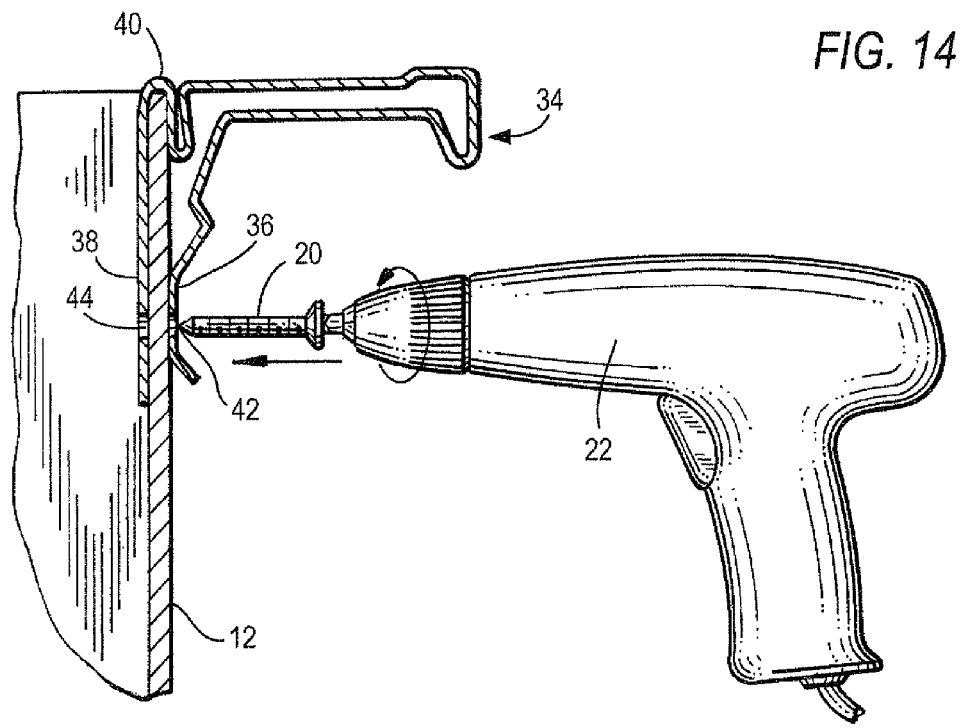
FIG. 14 is a left side cross-sectional view of the flange of FIGS. 7-8 adjacent to an end portion of a duct member, prior to assembly.

In the example embodiment of the present invention shown in FIG. 7, the flange 34 also includes a rear wall member 38 (also referred to herein as an inner wall member 38), with the wall members 36, 38 joined by an intermediate member 40. The wall members 36, 38 of the flange 34 are adapted, as shown in FIG. 14, to receive an end portion 12 of a duct member between the wall members 36, 38, and with the front wall member 36 abutting the exterior surfaces of the end portion 12, such that the front wall member 36 is externally exposed. As can be seen from FIG. 7, the intermediate member 40 includes an inner flange panel 41 and an outer flange panel 43. The inner flange panel 41 and outer flange panel 43 are connected to one another. A rib 45 is formed in the inner flange panel 41. The rib 45 is disposed proximate the rear wall member 38, and is separated from the rear wall member 38 by a distance substantially equal to the thickness of the duct member (e.g., see FIGS. 14 and 15). The proximity of the rib 45 to the rear wall member 38 prevents deflection of the flange 34 and thus enables a secure fastening of the flange 34 to the end portion 12 of the duct member. The inner flange panel 41 and outer flange panel 43 are configured such that the flange 34 is shaped for receiving corner pieces 58 (e.g., see FIG. 17).

The flange 34 may be fabricated from metal, such as aluminum, stainless steel, or other known metals or alloys, by methods known in the art, such as by stamping.

In the example embodiment, the flange 34 shown in FIG. 7 includes fastener entry areas 42 on at least the front wall member 36. Alternatively, the flange 34 may also include such fastener entry areas 44 on the rear wall member 38, as illustrated in the cut-away portion of the front wall member 36 in FIG. 7, such that the fastener entry areas 42, 44 are complementary; that is, each fastener entry area 42 on the front wall member 36 is substantially aligned with a respective fastener entry area 44 on the rear wall member 38.

Accordingly, referring to FIG. 14, when an end portion 12 of a duct member is positioned in the gap between the wall members 36, 38, a pair of complementary fastener entry areas 42, 44 are positioned at substantially identical locations on opposite sides of the end portion 12.

Figure 8:
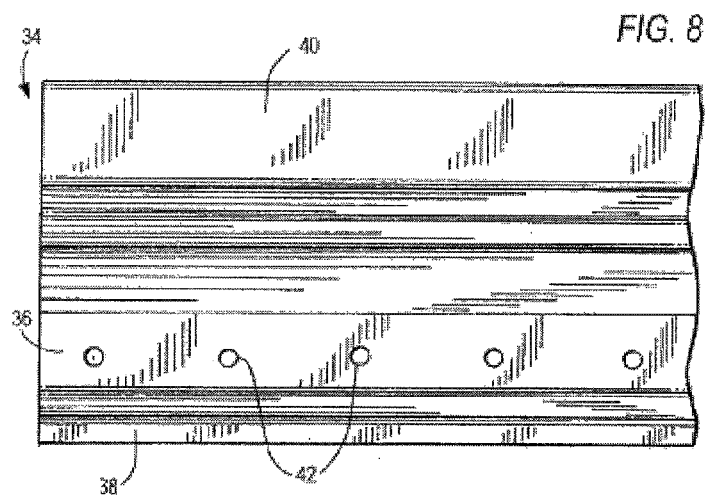
FIG. 8 is a front elevational view of the flange of FIG. 7 along lines 8-8 in FIG. 7.

As shown in FIGS. 7-8, a plurality of fastener entry areas 42, 44 are provided along the length of the flange 34 on each of the wall members 36, 38, respectively. In an example embodiment shown in FIG. 8, the plurality of fastener entry areas 42 are regularly spaced apart at predetermined equal distances along the length of the front wall member 36 of the flange 34. Similarly, the plurality of fastener entry areas 44 are regularly spaced apart at predetermined equal distances along the length of the rear wall member 38 of the flange 34.

In addition, the fastener entry areas 42, 44 may be spaced apart at predetermined metric distances, such as along one-centimeter intervals, or by predetermined English units, such as along one-inch intervals. The predetermined spacing permits an assembler to readily site one or more fastener entry areas 42, 44 at any selected distance, for example, from the corner of a duct, in order to meet predetermined specifications for assembly of the ducts. For example, an assembly specification may require a fastener 20 to be spaced at about two inches from a corner of a duct, so the flange 34 may be positioned along the end portion 12 to site a pair of fastener entry areas 42, 44 at two inches from the corner.

Referring to FIG. 9, in one example embodiment, each of the fastener entry areas 42, 44 on the wall members 36, 38 may be an aperture, forming a through hole 46, such as shown, for example, passing through the front wall member 36, with the through holes 46 being pre-fabricated apertures in the wall members 36, 38 for receiving fasteners to assemble the flange to the end of a duct member. The through holes 46 may be regularly spaced apart, as shown in FIG. 8, such that at least one fastener 20 can be inserted through the holes 46 at regular intervals along the length of the flange 34 and the length of the end portion 12 of the duct member.

Referring to FIG. 10, in another example embodiment, each of the fastener entry areas 42, 44 on the wall members 36, 38 may be an indentation 48, such as shown, for example, entering but not completely passing through the rear wall member 38, with the indentations 48 being pre-fabricated dimples or weakened points in the wall members 36, 38 for receiving fasteners to assemble the flange to the end of a duct member. The indentations 48 may be regularly spaced apart, as shown in FIG. 8, such that at least one fastener 20 can be inserted through the indentations 48 at regular intervals along the length of the flange 34 and the length of the end portion 12 of the duct member.

In another example, embodiment, the fastener entry areas 42 on the front wall member 36 may be through holes 46 as in FIG. 9, while the fastener entry areas 44 on the rear wall member 38 may be indentations 48 as in FIG. 10, or vice versa, to facilitate entry and passing through of the fastener 20 to assemble the flange 34 to the end portion 12, as described herein.

It is to be understood that the fastener entry areas 42, 44 on the wall members 36, 38 may be through holes or indentations of any shape, and not limited to circular holes 46 or indentations 48, as shown in the example embodiments in FIGS. 9-10. For example, in alternative embodiments shown in FIGS. 11-13, the fastener entry areas may be slots 50 forming an elongated hole having, for example, rounded ends, or may be a square hole 52 or a rectangular hole or slot 54. Such holes 50-54 may instead be replaced by indentations of similar shape. In the form of circular-ended slots 50 or rectangular slots 54 shown in FIGS. 11 and 13, respectively, the fastener entry areas 42, 44 facilitate entry of the fastener 20 therethrough even though the complementary fastener entry areas 42, 44 on opposite sides of the end portion 12 may not be perfectly aligned.

Referring to FIG. 14, during the mounting operation of the flange 34 to the end section 12, the flange 34 is positioned about the end portion 12, and with the fastener entry areas 42, 44 on either side of the end portion 12, with the fastener 20 oriented for insertion by the tool 22, and with the fastener entry areas 42, 44 being of any size and shape such as the shapes shown in FIGS. 9-13, and any configuration, such as any of the holes in FIGS. 9 and 11-13, being of any size, or an indentation of any size or shape such as the indentation 48 shown in FIG. 10. In the example shown in FIG. 14, the fastener entry areas 42, 44 are through holes in each respective wall member 36, 38, such as the holes 46 shown in FIG. 9. Alternatively, it is to be understood that the fastener entry areas 42, 44 on either side of the end portion 12 may be the indentations 48 shown in FIG. 10, or may also be a combination of through holes and indentations shown in FIGS. 9-13.

Figure 15:
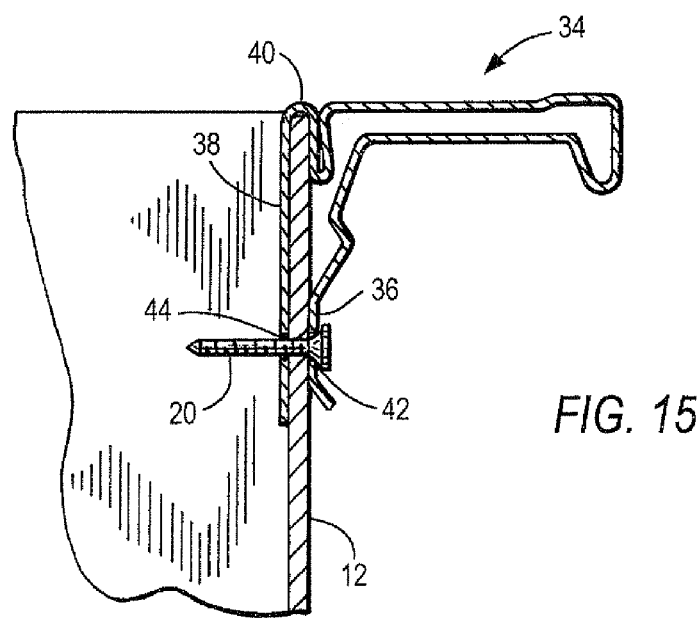
FIG. 15 is a left side cross-sectional view of the assembled end portion and flange of FIGS. 7-8.

With the fastener 20 positioned as shown in FIG. 14, the tool 22 more easily inserts the fastener 20 through the fastener entry areas 42, 44 and through the section of the end portion 12 between the fastener entry areas 42, 44 to form the assembled flange and end section shown in FIGS. 15-17.

Figure 1:
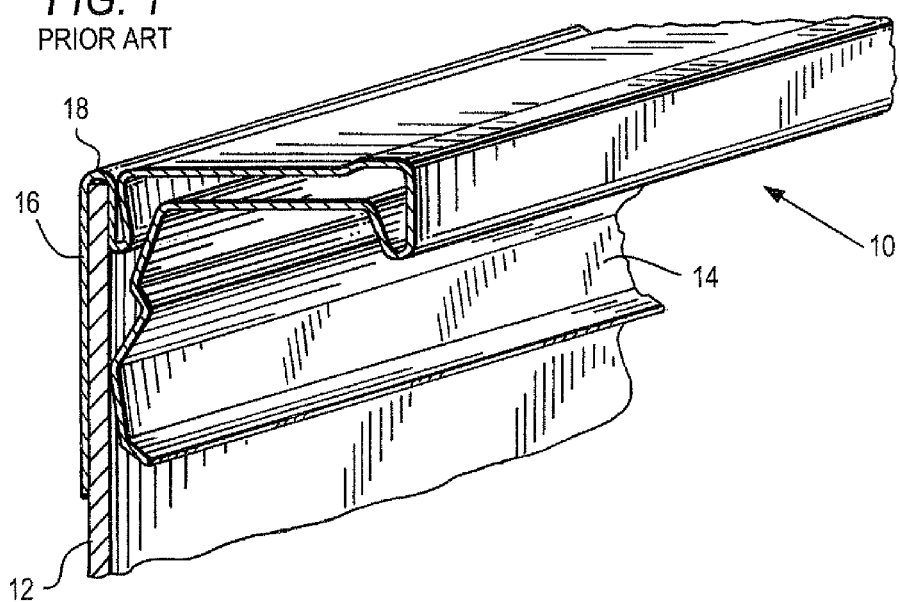
FIG. 1 is a top front left side perspective view of a flange and end portion of a duct member in the prior art.
Figure 2:
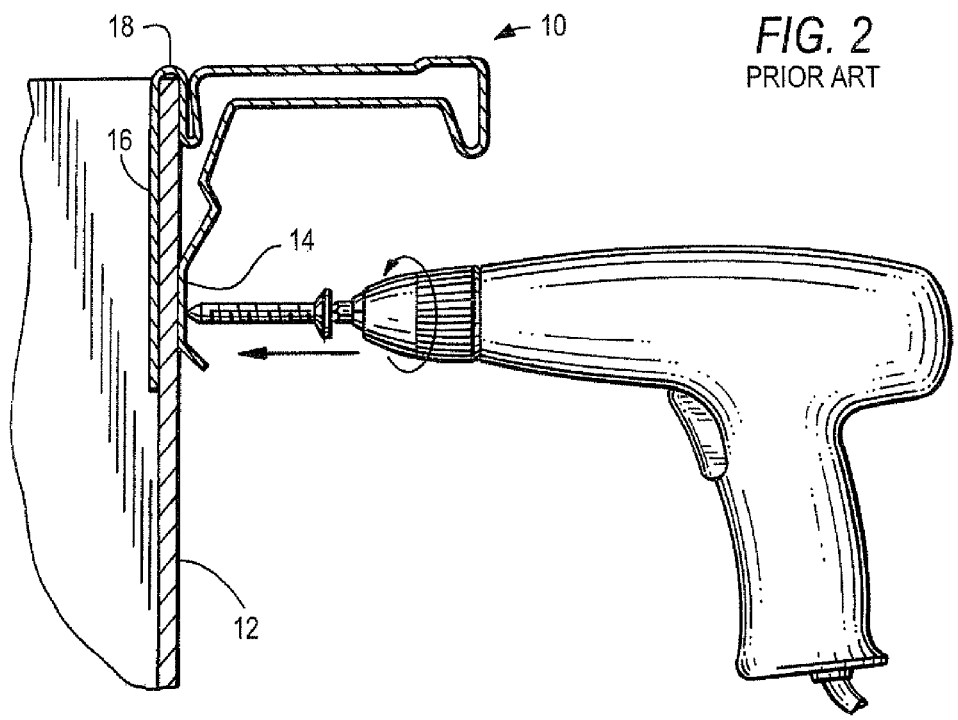
FIG. 2 is a left side cross-sectional view of the flange and end portion of FIG. 1, prior to assembly.
Figure 3:
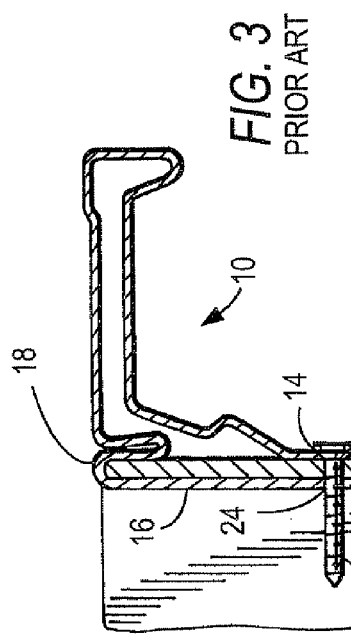
FIG. 3 is a left side cross-sectional view of the assembled flange and end portion.
Figure 4:
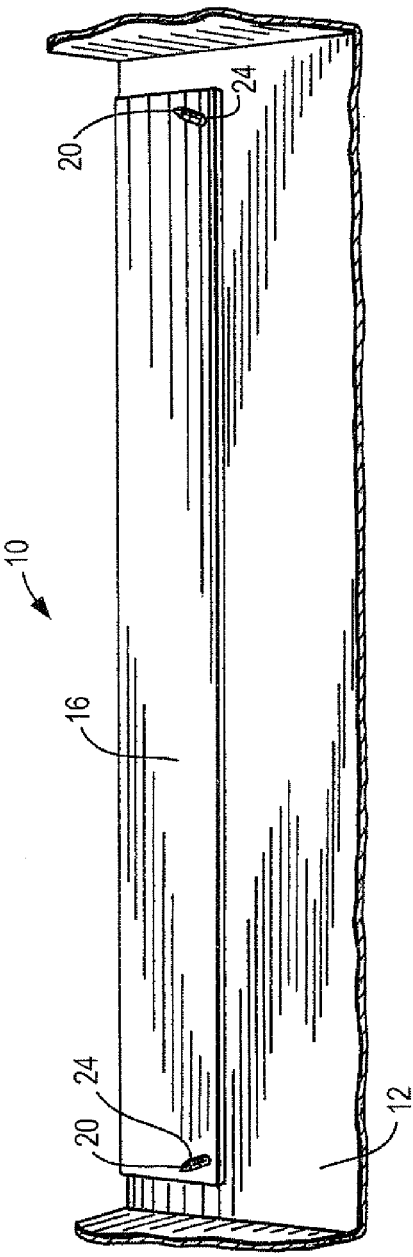
FIG. 4 is a bottom top rear perspective view of the assembled flange and end portion.
Figure 6:
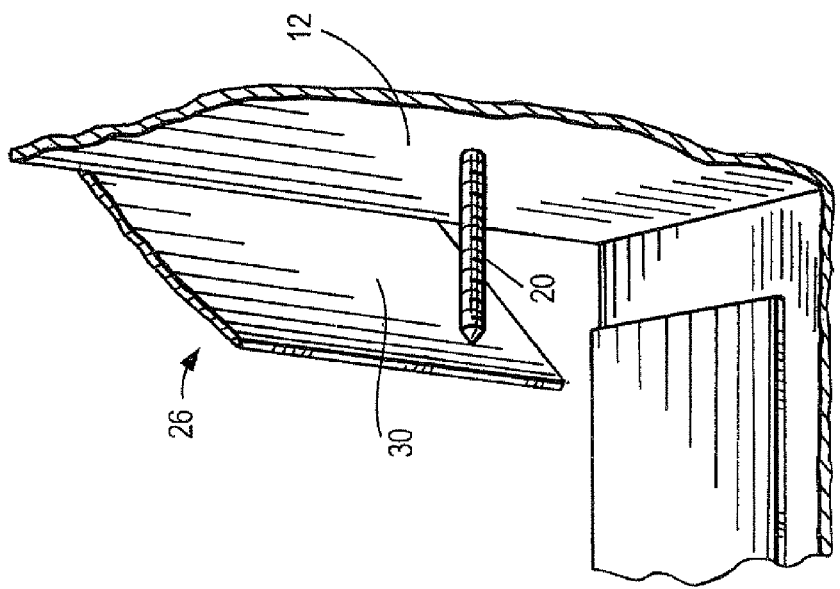
FIG. 6 is a bottom rear perspective view of the improperly assembled flange and end portion of FIG. 5.
Figure 5:
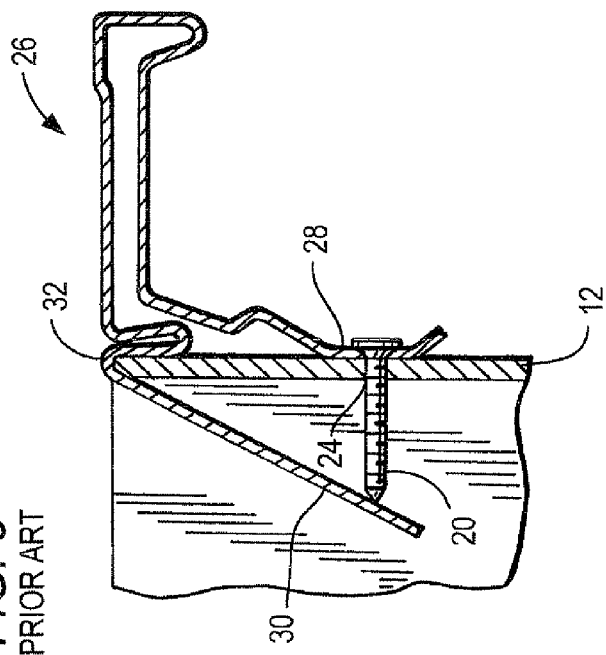
FIG. 5 is a left side cross-sectional view of an improperly assembled flange and end portion.

By providing such fastener entry areas 42, 44, assembly of the final configuration shown in FIGS. 15-17 is performed more quickly, more effectively, and with less force and torque required by the tool 22. In addition, since the rear wall member 38 has a complementary fastener entry area 44 ready to receive the fastener 20 passing through the adjacent region of the end portion 12, there is little or no chance for the fastener 20 to apply force to the rear wall member 38, and so the rear wall member 38 will not be pushed-out in an improper configuration as shown in FIGS. 5-6.

Accordingly, the final configuration of the flange 34 and the end portion 12 of the duct member may be assembled more rapidly and efficiently in the field with fewer or no mistakes requiring remedy. In effect, the effort to create the fastener entry areas 42, 44 is performed during fabrication of the flange 34, long before use and assembly in the field, so assemblers may complete their work more efficiently. As shown in FIG. 17, the combination of the flange 34 mounted to the end portion 12 of a duct member 56 can have corner pieces 58 mounted in adjoining flanges 34 on the corners of the ends of the duct member 56, in a manner similar to the use of corner pieces in the prior art. Pairs of duct members 56 having such mounted flanges 34 can then be assembled together, for example, by fastening complementary corner pieces 58 together.

In addition, since the fastener entry areas 42, 44 are regularly spaced along the length of the flange 34, the duct assembler in the field can readily locate multiple areas 42, 44 for inserting a predetermined number of fasteners 20 at any prescribed or required distance, for example, relative to a corner section of the duct member.

The material strength of the flange 34 is also maintained, since the fastener entry areas 42, 44 are relatively small in size compared to the overall dimensions of the flange 34. In addition, insertion of the fastener 20 through the flange 34 of the present invention will have less or no debris from the insertion point positioned between the flange 34 and the end portion 12, and so the assembled flange 34 and end portion 12 of FIGS. 15-17 will have a tighter fit compared to the assembly of the prior art shown in FIGS. 3-4.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. A flange for an end portion of a duct member having a thickness, comprising:
   an inner wall member;
   an outer wall member, which wall members are configured to receive the duct member end portion therebetween;
   an intermediate member that connects the inner and outer wall members, which intermediate member includes an inner flange panel connected to an outer flange panel, and a rib formed in the inner flange panel disposed proximate the inner wall member, which rib is separated from the inner wall member by a distance substantially equal to the thickness of the duct member end portion; and
   a plurality of pre-fabricated first apertures disposed in the inner wall member, and a plurality of pre-fabricated second apertures disposed in the outer wall member, wherein the pre-fabricated first apertures are substantially aligned with the pre-fabricated second apertures and the first and second apertures are sized to receive self-tapping screw fasteners there through to fasten the wall members to the end portion of the duct member.

2. The flange of claim 1, wherein the plurality of pre-fabricated first and second apertures are spaced apart at predetermined regular intervals along a length of each of the wall members.

3. The flange of claim 2, wherein the plurality of pre-fabricated first and second apertures are spaced apart at predetermined metric distances.

4. The flange of claim 2, wherein the plurality of pre-fabricated first and second apertures are spaced apart at predetermined English unit distances.

5. The flange according to claim 2, wherein the pre-fabricated first apertures or the pre-fabricated second apertures are sized as clearance apertures to receive the fasteners.

6. The flange according to claim 2, wherein the pre-fabricated first apertures, or the pre-fabricated second apertures, or both are elongated to facilitate alignment of the pre-fabricated first and second apertures for receiving fasteners therethrough.

7. The flange according to claim 2, wherein the plurality of pre-fabricated first apertures are spaced apart from one another by uniform distances within the inner wall member.

8. The flange according to claim 7, wherein the plurality of pre-fabricated second apertures are spaced apart from one another by uniform distances within the outer wall member.

9. A method for fastening a flange to an end portion of a duct member, which duct member end portion has a thickness, the method comprising the steps of:
providing a flange that includes an inner wall member, an outer wall member, which wall members are configured to receive the duct member end portion therebetween, an intermediate member that connects the inner and outer wall members, which intermediate member includes an inner flange panel connected to an outer flange panel, and a rib formed in the inner flange panel disposed proximate the inner wall member, which rib is separated from the inner wall member by a distance substantially equal to the thickness of the duct member end portion, a plurality of pre-fabricated first apertures disposed in the inner wall member, and a plurality of pre-fabricated second apertures disposed in the outer wall member, wherein the pre-fabricated first apertures are substantially aligned with the pre-fabricated second apertures, and the first and second apertures are sized to receive self-tapping screw fasteners there through;
positioning the wall members adjacent to the end portion; and
passing self-tapping screw fasteners through the pre-fabricated second apertures, tapping the fasteners through the duct member end portion, and passing the fasteners through the pre-fabricated first apertures thereby securing the flange to the end portion.

10. The method of claim 9, wherein the step of providing a flange includes providing a flange wherein the plurality of pre-fabricated first apertures are spaced apart from one another by uniform distances within the inner wall member, and the plurality of pre-fabricated second apertures are spaced apart from one another by the uniform distances within the outer wall member.

11. The method of claim 10, wherein the uniform distances are metric increments.

12. The method of claim 10, wherein the uniform distances are predetermined English unit increments.

13. A flange for a duct member, comprising:
an inner wall member, an outer wall member, each of which wall members has a solid wall thickness, and an intermediate member extending between the inner and outer wall members, which inner and outer wall members are positioned to receive an end portion of the duct member therebetween; and
a plurality of pre-fabricated apertures disposed in one of the inner wall member or outer wall member, and a plurality of pre-fabricated indentations disposed in the other of the inner wall member or outer wall member, each of which indentations form a decreased solid wall thickness region relative to the adjacent wall thickness of the wall member, wherein the pre-fabricated apertures are substantially aligned with the pre-fabricated indentations to align fasteners with the decreased solid wall thickness indentations to facilitate attachment of the wall members to the end portion of the duct member.

14. A method for attaching duct members, each duct member having a thickness, comprising the steps of:
providing a plurality of flanges, each having an inner wall member, an outer wall member, an intermediate member that connects the inner and outer wall members, which intermediate member includes an inner flange panel connected to an outer flange panel, and a rib formed in the inner flange panel disposed proximate the inner wall, which rib is separated from the inner wall by a distance substantially equal to the thickness of the duct member, a plurality of pre-fabricated first apertures disposed in the inner wall member, a plurality of pre-fabricated second apertures disposed in the outer wall member, wherein the pre-fabricated first apertures are substantially aligned with the pre-fabricated second apertures, and the first and second apertures are sized to receive self-tapping screw fasteners there through;
mounting one of the flanges on each end portion of the duct members, such that the duct member end portion is disposed between the inner and outer wall members of the respective flange;
for each duct member end portion, passing a portion of the self-tapping screw fasteners through the pre-fabricated second apertures, tapping through the respective end portion with the screw fasteners, and passing a portion of the screw fasteners through the aligned pre-fabricated first apertures; and
attaching the duct members together by attaching the flanges of one of the duct members to the flanges of another of the duct members.

* * * * *